Jan. 29, 1952 R. S. EDWARDS 2,583,552
MOTOR CONTROL CIRCUIT MIXER
Filed April 29, 1944
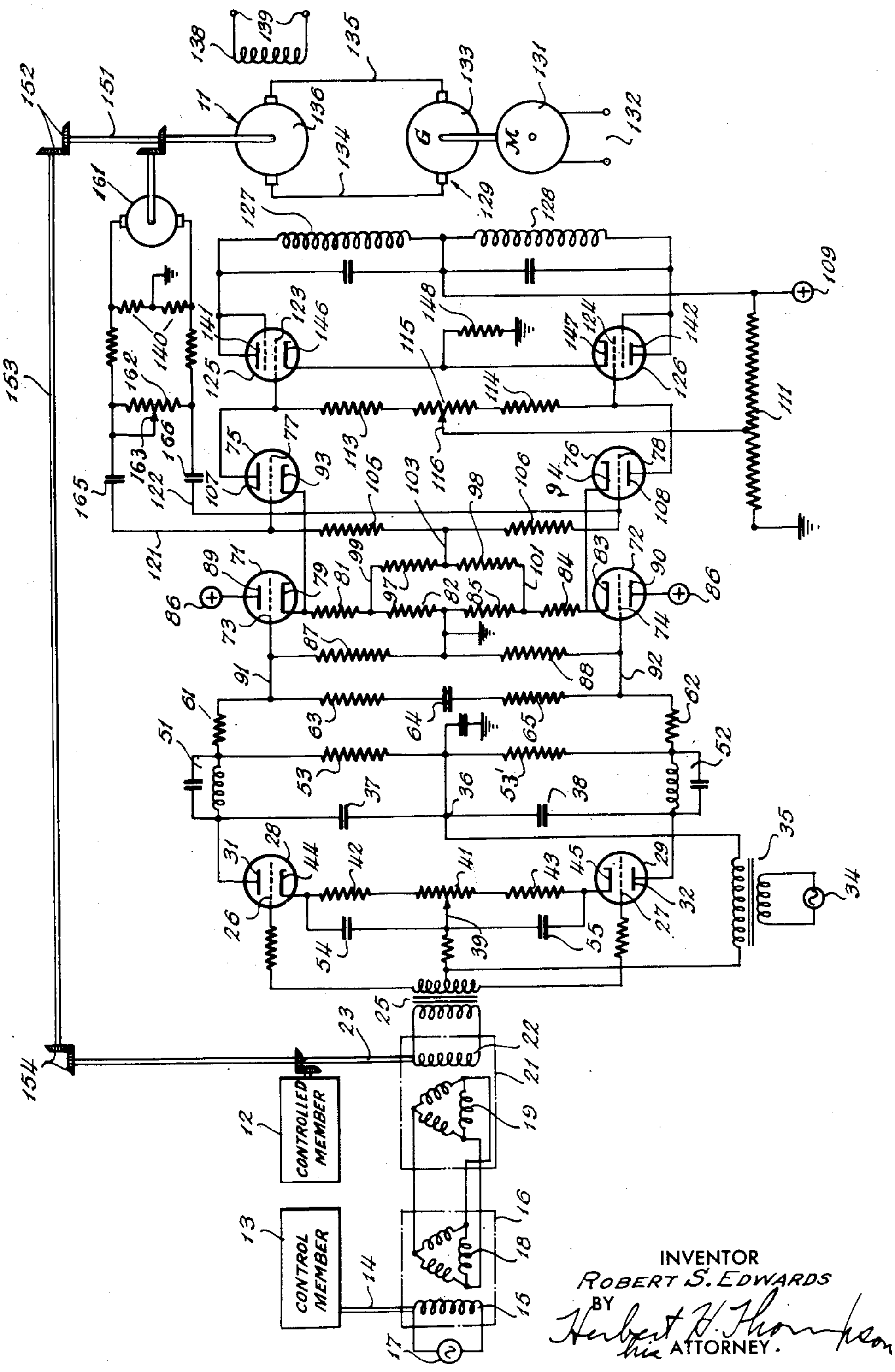
INVENTOR
ROBERT S. EDWARDS
BY
Herbert H. Thompson
his ATTORNEY.

Patented Jan. 29, 1952 2,583,552

UNITED STATES PATENT OFFICE 2,583,552

MOTOR CONTROL CIRCUIT MIXER

Robert S. Edwards, Hempstead, N. Y., assignor to The Sperry Corporation, a corporation of Delaware Application April 29, 1944, Serial No. 533,279

5 Claims. (Cl. 250—27)

This invention relates to a mixer amplifier for motor control circuits and particularly concerns an improvement in the mixer amplifier circuit disclosed in copending application Serial Number 530,227, filed April 8, 1944, in the name of Rawley D. McCoy, now U. S. Patent No. 2,478,203, which issued August 9, 1949.

An object of the invention is to provide an amplifier for mixing and amplifying two control signals to control a motor in which the desired bias is obtained by controlling the grid potentials according to the cathode potentials.

Another object of the invention is to provide a balanced mixer amplifier circuit for combining two signals to control a motor according to the algebraic sum or difference of the signals in which the desired bias is obtained by controlling the grid potentials according to the average potentials of the cathodes.

A further object of the invention is to provide a balanced mixer amplifier in a motor control circuit which may be connected to a pair of high impedance signal sources in which a desired bias potential is automatically maintained.

Other objects and advantages of this invention will become apparent from the specification, taken in connection with the accompanying drawing which is a schematic wiring diagram of a positional control circuit embodying the invention.

One advantageous use of the present invention is in a mixer amplifier for a motor control circuit in which a pair of electron discharge tubes, each including at least three electrodes, are connected in a balanced circuit with suitable impedances in the form of resistances connected between corresponding electrodes of each of tubes and balanced relative to a source of potential from a suitable power supply. A first control signal, for example the error signal in a positional control system, differentially adjusts the potentials of the cathodes of the tubes, and a second control signal which may be developed according to the speed of the controlled motor is used differentially to adjust the potentials of the grids of these tubes. The potential between the grid and cathode circuits is adjusted to bias the individual tubes in a manner such that the difference between their space currents is substantially proportional to the algebraic difference between the differentially applied signals. The difference between the space currents controls a balanced power amplifier circuit which adjusts the field currents in opposing fields of a generator according to the difference between the space currents in the electron discharge devices and thereby controls the voltage applied to a motor. Since the voltage of the generator varies the speed of the motor, the speed depends upon the algebraic difference of the signals.

According to the invention in its preferred form, the mixer amplifier includes a pair of electronic tubes arranged in a balanced cathode follower circuit with suitable impedances or cathode resistors connected between the respective cathodes and the power supply so the potential of these cathodes varies differentially with the application of differential potentials to the grids. A pair of mixer tubes are also arranged in a balanced circuit with a power supply and have their cathodes connected directly to the cathodes of the cathode follower tubes. In order to provide a suitable bias to operate the mixer tubes on a linear portion of their mutual characteristic curves an averaging network formed by a resistor is connected across selected symmetrically arranged points in the cathode resistors and has its mid point connected to the control grids of the mixer tubes so that the potential of these control grids is determined by the average potentials of the cathodes.

With this arrangement, the differential potentials applied respectively to the control grids of the cathode follower tubes and the control grids of the mixer tubes, control the space currents in the mixer tubes so their difference is substantially proportional to the algebraic difference of the differential potentials.

The drawing shows the invention embodied in a positional control system for operating a motor 11 to position a controlled member 12 according to or synchronously with the position of a control member 13. The control member 13 is connected as by shaft 14 to position rotor 15 of a conventional synchro-transformer 16 which may be of the "Selsyn," "Telegon," or "Autosyn" type well-known in the art. The rotor winding 15 is energized by a suitable source of alternating current 17, and induces a voltage in stator winding 18 which is connected to a corresponding multiple winding 19 of a second synchro-transformer 21, having a rotor winding 22 positioned as by shaft 23 according to the position of the controlled member 12. As is well-known in this type of transmission system a reversible phase variable magnitude voltage is induced in the rotor winding 22 depending upon the direction and magnitude of the displacement from synchronous position of the two rotor windings 15 and 22 which correspond to the positional displacement of the controlled and control members 12 and 13 respectively.

The reversible phase variable magnitude alternating voltage may be coupled as by a transformer 25 to be applied in phase opposition to grids 26 and 27 of a pair of triodes 28 and 29 which are connected in a well-known balanced demodulator circuit. An alternating voltage is applied to plates 31 and 32 of the tubes 28 and 29 from a source 34 which may be the same or synchronized with the source 17. One side of the transformer 35 is connected to a center point 36 between condensers 37 and 38 which are connected to the plates 31 and 32. The other side of the transformer 35 is connected through slider 39 of variable resistor 41 as well as cathode resistors 42 and 43 to cathodes 44 and 45 of the demodulation tubes 28 and 29.

With the circuit above described the direct current component of the potential of plates 31 and 32, which are connected through filter circuits 51 and 52 and load resistors 53 and 53′ to the center point 36, is proportional to the error signal from the rotor winding 22. In control circuits of this type it is usually desirable to modify this error signal according to its rate of change. One arrangement in introducing a rate component is by connecting condensers 54 and 55 across cathode resistors 42 and 43. The capacity of condensers 54 and 55 are selected to a smaller impedance, at control frequencies, than the impedance of resistors 42 and 43 so the unidirectional component of the potential of plates 31 and 32 will be dependent upon the error signal as well as its rate of change and may be referred to as a composite error and error rate signal.

It will be apparent from this description that filters 51 and 52 will pass only the unidirectional component of the plate current of the plates 31 and 32, and the voltage across load resistors 53 and 53′ will be a differentially variable unidirectional voltage that is proportional to the composite error and error rate signals. This differential voltage which corresponds to the error and rate of change thereof is applied through resistors 61 and 62 across an error integrating circuit composed of resistor 63, condenser 64 and resistor 65 which adds a third component corresponding to the integral of the displacement error. As is well-known, integrating circuits of this type have a relatively high impedance, hence must for consistent operation be applied to a comparable high impedance input circuit.

The mixer amplifier embodying the invention includes a pair of cathode follower tubes 71 and 72 forming a high impedance input for a control signal applied to their respective grids 73 and 74, and a pair of mixer tubes 75 and 76 forming a high impedance input for a second control signal applied to their respective grids 77 and 78. Cathode 79 of the follower tube 71 is connected through a cathode impedance formed by cathode resistors 81 and 82 to ground, and cathode 83 of the tube 72 is similarly connected through a cathode impedance formed by cathode resistors 84 and 85 to ground. The grids 73 and 74 of the cathode follower tubes are likewise balanced to ground by grid resistors 87 and 88, respectively, across which the composite error, error rate and error integral signal is applied by leads 91 and 92 from the demodulator and integrating circuit previously described. Plates 89 and 90 of the cathode follower tubes are connected to a suitable source 86 of positive potential.

The output of the demodulator is formed by the integrating circuit, which has a relatively high impedance; hence, the input for the mixer amplifier preferably has a similarly high impedance. This high input impedance is formed by the grid circuits of the balanced cathode follower circuit. As is well known in cathode followers of this type, the voltage of cathodes 79 and 83 will follow the voltage of grids 73 and 74. The voltage difference between cathodes 79 and 83 of the follower tubes will be proportional to the differential voltage applied to grids 73 and 74 which depend upon the composite error, error rate and the error integral signals applied from the demodulator and integrating circuit.

Cathodes 93 and 94 of the mixer tubes 75 and 76 are connected directly to cathodes 79 and 83 of the follower tubes 71 and 72, respectively. In this manner the potentials of mixer cathodes 93 and 94 are controlled by the voltages applied to follower grids 73 and 74. Therefore, the differential voltage of cathodes 93 and 94 is substantially proportional to the composite signal applied to the cathode follower tubes from the demodulator circuit.

In the mixer amplifiers of this type, it is desirable to control the motors according to the sum of the two mixed signals, so it is necessary to have a substantially linear response from the mixer tubes. To provide a linear response, the mixer tubes are biased to operate on a substantially linear portion of their mutual characteristic curves. This bias is obtained by controlling the potentials of grids 77 and 78 according to the average potential of the cathodes of the mixer tubes which are connected to the cathodes of the follower tubes.

An averaging impedance in the form of averaging resistors 97 and 98 is connected by leads 99 and 101 across resistors 82 and 85. The cathode resistors 81 and 84 in the two cathode follower circuits are equal, as are resistors 82 and 85, so the averaging impedance is arranged symmetrically across a selected portion of the cathode impedance with respect to ground. The ratio between resistors 81 and 82 and resistors 84 and 85 is chosen so the voltage of lead 103 connected between the resistors 97 and 98, that is, the mid point of the averaging impedance, differs from the average potentials of cathodes 93 and 94 by the bias potential necessary to operate the mixer tubes on a linear portion of their mutual characteristic curves. The potential of the lead 103 is used to control the potential of grids 77 and 78 of the mixer tubes by connections through grid resistors 105 and 106 to these grids, respectively.

In this manner, the potentials of cathodes 93 and 94 of the mixer tubes 75 and 76 are controlled by the potentials of cathodes 79 and 83 of the cathode follower tubes, which, in turn, depend upon the signal from the demodulator circuit as applied to the grids of the cathode follower. The grid potential of the grids 77 and 78 of the mixer tubes 75 and 76 depends upon the average potential of the cathodes 93 and 94 and is at a sufficiently lower potential to bias the grids to normally operate the mixer tubes on a linear portion of their mutual characteristic curves. The amount of this bias potential depends upon the size of resistors 81 and 84 which form a portion of the tube cathode impedances, so their average potential approximates the desired bias potential for the mixer tubes.

The mixer tubes 75 and 76 have their plates 107 and 108 also arranged in a balanced circuit with respect to a power supply having a positive terminal 109. A voltage divider 111 is connected across the power supply, and the plates 107 and 108 of the mixer tubes are connected through load resistors 113 and 114 as well as adjustable balancing resistor 115 having a slider 116 connected to a selected point on the voltage divider 111. The slider may be adjusted on the resistor 115 to properly balance the mixer amplifier circuit.

As will become apparent from the following description, a second control signal in the form of a velocity signal is connected by leads 121 and 122 to grids 77 and 78 for differentially varying the potential of these grids, that is, by changing one positive and the other negative with respect to ground depending upon the desired effect of the signal.

Since the mixer tubes 75 and 76 are biased to operate on the linear portion of their characteristic curves, their respective space currents will be proportional to the voltage between their grids and cathodes since the plate supply voltage is maintained substantially constant. In addition the space currents in these tubes will be equal under quiescent conditions. When the potentials of the grids and cathodes are varied differentially, the space currents will likewise vary differentially and the difference between the space currents will be proportional to the algebraic difference between the potentials of the cathodes and the grids corresponding to the composite signal and the speed or velocity signal, respectively.

This difference in space currents will develop a differential voltage across load resistors 113 and 114 which may be applied to control grids 123 and 124 of power amplifier tubes 125 and 126 that are also arranged in a balanced circuit having their plates connected through opposing windings 127 and 128 of the field of a direct current generator 129 of a variable speed drive known as the Ward-Leonard type. As is well-known this type of variable speed drive includes a constant speed motor 131 energized from any suitable source 132 for driving armature 133 of the generator 129. The voltage generated in armature 133 is connected as by leads 134 and 135 to an armature 136 of motor 11, having its field 138 connected to a constant source 139.

Plates 141 and 142 of the tubes 125 and 126 are connected through the field windings 127 and 128 to the source of positive potential 109 and cathodes 146 and 147 of these tubes are connected through a common cathode resistor 148 to ground.

Since the potentials of control grids 123 and 124 are varied differentially according to the combined error and velocity signals, the space currents in these tubes are likewise varied differentially so the resultant field of opposed windings 127 and 128 causes the generator 129 to produce a voltage of a polarity and magnitude corresponding to the combined error and velocity signals. This voltage is applied to the armature 136 of the motor 11 to drive the motor at a rate substantially proportional to the combined signals. The motor 11 drives through shaft 151, gearing 152, shaft 153 and gearing 154 to turn the shaft 23 to position the controlled member 12 as well as the rotor winding 22.

A speed or velocity signal is developed by a suitable generator 161 which may be of the permanent magnet type, is driven by the motor 11 to produce a voltage proportional to the velocity of the controlled member 12. This velocity voltage is applied through a suitable network 140 to provide a velocity voltage balanced to ground that is applied across a potentiometer 162 having its slider 163 positioned to pick off a proportion of the velocity voltage which may be applied to the grids 77 and 78 to be combined with the composite error voltage applied to cathodes 93 and 94 of the mixer tubes. This selected portion of the velocity voltage is supplied through condensers 165 and 166 and leads 121 and 122 to grids 77 and 78 respectively. The purpose of the condensers 165 and 166 is to block the speed voltage except during changes in the velocity of the motor. In the circuit shown in the drawing, a composite signal from the balanced demodulator circuit normally or under constant speed conditions controls the motor to drive at a velocity proportional to the error, error rate and error integral.

In order to avoid "hunting" some velocity damping is desired. Hence, the circuit shown drives the motor 11 at a velocity proportional to the difference between the composite error voltage from the demodulator and the velocity damping voltage from the generator 161. Since this damping is only necessary during accelerations of the motor 11, the condensers 165 and 166 serve to eliminate it during constant velocity periods. This type of velocity damping signal is sometimes referred to as a "speed lag voltage with wipe-out." When a positional error occurs between controlled member 12 and control member 13, an error signal is applied to the balanced demodulator which produces a composite unidirectional voltage including error, error rate and error integral components. This voltage is applied to the cathode followers to differentially adjust the potentials of the cathods of the mixer tubes. The velocity damping voltage from the armature circuit of motor 11 is applied to grids 77 and 78 to differentially vary the potentials of these grids according to the velocity of the motor 11. The mixer amplifier tubes 75 and 76 are biased according to the average potentials of the cathodes to a point on the linear portion of their characteristic curves so their respective space currents depend upon the algebraic difference between the voltages applied to their respective cathodes and grids. By this arrangement the difference in the space currents of the mixer tubes is proportional to the algebraic difference between the differential voltages applied to the cathodes 93 and 94 and the differential voltage applied to the grids 77 and 78.

This difference in space currents controls the power amplifier circuit including the tubes 125 and 126 to vary the currents in opposed field windings 127 and 128 for causing the generator 129 to develop a voltage for driving the motor 11 at a speed which is dependent upon and actually substantially proportional to the algebraic difference (or sum as the case may be) of the composite error, error rate and error integral signal and the velocity damping signal to move the controlled member 12 in a direction to reduce the positional control error. The rate at which this error is reduced depends upon the error and velocity of the motor 11.

High impedance input circuits for the mixer amplifier are provided by the grid circuits of the cathode follower and the mixer tubes. The cathode potentials of the mixer tubes are controlled differentially according to one signal and the grid potentials are controlled differentially according to a second signal. A linear response of the mixer tubes is provided by maintaining a proper bias potential between the cathodes and the grids of these tubes. This is accomplished by controlling the potentials of the grids jointly according to a selected portion of the average cathode potentials. Since the average cathode potentials are used, the grids are unaffected by a potential difference between the cathodes resulting from an error signal.

There is very little degeneration in the mixer amplifier because the cathode to cathode impedance is relatively small. Therefore, differential voltages applied to the cathodes and grids may be amplified considerably in the mixer amplifier and the motor smoothly controlled according to the relatively small difference between the two signals.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a motor control circuit, a mixer amplifier for combining control signals to jointly control operation of a motor comprising a first pair of electron discharge devices arranged in a balanced cathode follower circuit including a cathode impedance connected between the cathodes of said devices and having its center point connected to a power supply, a second pair of electron discharge devices arranged in a balanced circuit with a power supply and having their cathodes connected to the cathodes of said first pair of devices, a second impedance connected across a selected portion of said first impedance and having its center point connected to the control electrodes of said second pair of devices for providing a bias potential between the cathodes and control electrodes of said second pair of devices dependent upon the average potential of said cathodes.

2. In a motor control circuit, a mixer amplifier for combining control signals to jointly control operation of a motor comprising a first pair of electron discharge devices arranged in a balanced cathode follower circuit including a cathode impedance connected between the cathodes of said devices and having its center point connected to a power supply, a second pair of electron discharge devices arranged in a balanced circuit with a power supply and having their cathodes connected to the cathodes of said first pair of devices, a second impedance connected across a selected portion of said first impedance and having its center point connected to the control electrodes of said second pair of devices for providing a bias potential between the cathodes and control electrodes of said second pair of devices dependent upon the average potential of said cathodes, means responsive to a control signal for applying a differential potential to the control electrodes of said first pair of devices to differentially control the potentials of said cathodes to produce a difference between the space currents of said second pair of devices dependent upon said signal.

3. In a motor control circuit, a mixer amplifier for combining a pair of control signals to jointly control operation of a motor comprising a first pair of electron discharge devices arranged in a balanced cathode follower circuit including a cathode impedance connected between the cathodes of said devices and having its center point connected to a power supply, a second pair of electron discharge devices arranged in a balanced circuit with a power supply and having their cathodes connected to the cathodes of said first pair of devices, a second impedance connected across a selected portion of said first impedance and having its center point connected to the control electrodes of said second pair of devices for providing a bias potential between the cathodes and control electrodes of said second pair of devices dependent upon the average potential of said cathodes, means responsive to a first control signal for applying a differential potential to the control electrodes of said first pair of devices to differentially control the potentials of said cathodes, and means responsive to a second control signal for applying a differential potential to the control electrodes of said second pair of devices.

4. In a motor control circuit, a mixer amplifier for combining a pair of control signals to jointly control operation of a motor comprising a first pair of electron discharge devices arranged in a balanced cathode follower circuit including a cathode impedance connected between the cathodes of said devices and having its center point connected to a power supply, a second pair of electron discharge devices arranged in a balanced circuit with a power supply and having their cathodes connected to the cathodes of said first pair of devices, a second impedance connected across a selected portion of said first impedance and having its center point connected to the control electrodes of said second pair of devices for providing a bias potential between the cathodes and control electrodes of said second pair of devices dependent upon the average potential of said cathodes, means responsive to a first control signal for applying a differential potential to the control electrodes of said first pair of devices to differentially control the potentials of said cathodes, and means responsive to a second control signal for applying a differential potential to the control electrodes of said second pair of devices, said second impedance being connected across such a portion of said first impedance to produce a bias potential in a manner such that the difference between the space currents of said second pair of devices is substantially proportional to the algebraic difference of said signals.

5. In a motor control circuit, a source of first signal voltage and a separate source of a second signal voltage, a mixer amplifier for combining the control signals to jointly control the operation of a motor comprising a pair of electron discharge devices having cathodes, anodes and control electrodes connected in a balanced circuit with a power supply, a first impedance connected between said cathodes and having its center point connected to said supply, a second impedance connected across a fractional part only of said first impedance and across substantially equal values of said first impedance on both sides of its center point to provide a bias potential at the center point of said second impedance that is dependent upon but less than the average potentials of the cathodes of said devices and at a sufficiently lower potential as to cause said devices to operate on a linear portion of their mutual characteristic curves, the center point of said second impedance being connected to said control elctrodes for applying said bias potential thereto, means for applying said first signal voltage in differential fashion to the cathodes of said devices and across the entire first impedance connected therebetween, and means for supplying said second signal voltage in differential fashion to the control electrodes of said devices.

ROBERT S. EDWARDS.

REFERENCES CITED

The following references are of record in the file of this patent:

UNITED STATES PATENTS

| Number | Name | Date |
|---|---|---|
| 2,256,085 | Goodale | Sept. 16, 1941 |
| 2,270,295 | Harley | Jan. 20, 1942 |
| 2,288,600 | Arndt, Jr. | July 7, 1942 |
| 2,296,107 | Kimball | Sept. 15, 1942 |
| 2,330,109 | Brown | Sept. 21, 1943 |
| 2,399,695 | Satterlee | May 7, 1946 |
| 2,425,600 | Coykendall | Aug. 12, 1947 |
| 2,431,832 | Schlesinger | Dec. 2, 1947 |
| 2,464,249 | McCoy | Mar. 15, 1949 |
| 2,478,203 | McCoy | Aug. 9, 1949 |